United States Patent
Kim et al.

(10) Patent No.: US 10,429,112 B2
(45) Date of Patent: Oct. 1, 2019

(54) CONTROL METHOD FOR REFRIGERATOR

(71) Applicant: LG ELECTRONICS INC., Seoul (KR)

(72) Inventors: Namhun Kim, Seoul (KR); Buhwan Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 244 days.

(21) Appl. No.: 15/265,335

(22) Filed: Sep. 14, 2016

(65) Prior Publication Data

US 2017/0082337 A1 Mar. 23, 2017

(30) Foreign Application Priority Data

Sep. 17, 2015 (KR) .................. 10-2015-0131915

(51) Int. Cl.
F25B 49/02 (2006.01)
F25B 13/00 (2006.01)
F25D 11/02 (2006.01)

(52) U.S. Cl.
CPC .......... *F25B 49/022* (2013.01); *F25B 13/00* (2013.01); *F25B 49/025* (2013.01); *F25D 11/02* (2013.01);
(Continued)

(58) Field of Classification Search
None
See application file for complete search history.

(56) References Cited

U.S. PATENT DOCUMENTS

2010/0083688 A1* 4/2010 Hausmann ............ F25B 49/022
62/441
2010/0117625 A1* 5/2010 Botts ...................... G01R 22/10
324/103 R (Continued)

FOREIGN PATENT DOCUMENTS

EP 2685188 1/2014
JP 2000-220939 8/2000

(Continued)

OTHER PUBLICATIONS

Extended European Search Report in European Application No. 16189294.8, dated Jan. 13, 2017, 5 pages (with English translation).

(Continued)

*Primary Examiner* — Ljiljana V. Ciric
*Assistant Examiner* — Alexis K Cox
(74) *Attorney, Agent, or Firm* — Fish & Richardson P.C.

(57) ABSTRACT

A control method for a refrigerator includes driving a refrigerator compartment compressor that is configured to cool a refrigerator compartment; determining whether a temperature in the refrigerator compartment satisfies a first temperature; driving, based on the determination that a temperature in the refrigerator compartment satisfies the first temperature, a freezer compartment compressor that is configured to cool a freezer compartment; stopping the refrigerator compartment compressor; maintaining, after stopping the refrigerator compartment compressor, operation of the freezer compartment compressor; restarting the refrigerator compartment compressor; and varying a driving frequency of the refrigerator compartment compressor.

16 Claims, 5 Drawing Sheets

(52) U.S. Cl.
CPC ........ *F25D 11/022* (2013.01); *F25B 2400/06* (2013.01); *F25B 2600/021* (2013.01); *F25B 2700/2104* (2013.01); *Y02B 30/741* (2013.01); *Y02B 40/32* (2013.01)

(56) References Cited

U.S. PATENT DOCUMENTS

| | | | | |
|---|---|---|---|---|
| 2011/0302939 | A1* | 12/2011 | Rockenfeller | H02P 1/30 62/89 |
| 2012/0186284 | A1* | 7/2012 | Choi | F25B 7/00 62/115 |
| 2013/0180278 | A1* | 7/2013 | Yamashita | F25B 6/04 62/335 |
| 2017/0059228 | A1* | 3/2017 | Hu | F25D 17/065 |

FOREIGN PATENT DOCUMENTS

| | | |
|---|---|---|
| JP | 2012-141074 | 7/2012 |
| KR | 10-0850672 | 8/2008 |
| KR | 10-2011-0089532 | 8/2011 |

OTHER PUBLICATIONS

Office Action issued in Korean Application No. 10-2015-0131915 dated Sep. 27, 2016, 5 pages.

\* cited by examiner

CONTROL METHOD FOR REFRIGERATOR

CROSS-REFERENCE TO RELATED APPLICATION

The application claims priority under 35 U.S.C. § 119 and 35 U.S.C. § 365 to Korean Patent Application No. 10-2015-0131915 filed Sep. 17, 2015 whose entire disclosure is hereby incorporated by reference.

TECHNICAL FIELD

The present disclosure generally relates to refrigerator control technology.

BACKGROUND

A refrigerator is an appliance that stores food at a low temperature in a storage space formed therein to be opened and closed by a door. The refrigerator is formed to cool an inside of the storage space using cooling gas generated through heat exchange with a refrigerant circulated in a refrigeration cycle, and thus to keep the stored food in an optimum state.

An internal space of the refrigerator is partitioned into a refrigerator compartment and a freezer compartment, and the refrigerator compartment and the freezer compartment are cooled by supplying of cooling gas generated from an evaporator during a refrigeration cycle.

SUMMARY

The present disclosure is related to a refrigerator control method. The method is used for a refrigerator to control operations of a refrigerator compartment compressor and a freezer compartment compressor. The method may improves power efficiency of a refrigerator.

During the refrigeration cycle for cooling the refrigerator compartment and the freezer compartment, a compressor, a condenser, and an evaporator may operate. In some implementations, a refrigerator may include one or more evaporators and expanders. When a refrigerator includes a plurality of expanders and evaporators, flow of refrigerant may be diverged. The refrigerant may be selectively supplied to each of the evaporators by a valve, and thus the space in the refrigerator may be cooled by the evaporators.

In general, one innovative aspect of the subject matter described in this specification can be embodied in a control method for a refrigerator, comprising: driving a refrigerator compartment compressor that is configured to cool a refrigerator compartment; determining whether a temperature in the refrigerator compartment satisfies a first temperature; driving, based on the determination that a temperature in the refrigerator compartment satisfies the first temperature, a freezer compartment compressor that is configured to cool a freezer compartment; stopping the refrigerator compartment compressor; maintaining, after stopping the refrigerator compartment compressor, operation of the freezer compartment compressor; restarting the refrigerator compartment compressor; and varying a driving frequency of the refrigerator compartment compressor.

The foregoing and other embodiments can each optionally include one or more of the following features, alone or in combination. In particular, one embodiment includes all the following features in combination. Stopping the refrigerator compartment compressor includes: determining whether a temperature in the refrigerator compartment satisfies a second temperature; and stopping, based on the determination that a temperature in the refrigerator compartment satisfies the second temperature, the refrigerator compartment compressor. Stopping the refrigerator compartment compressor includes: determining whether a set time has elapsed since the freezer compartment compressor was started; and stopping, based on the determination that the set time has elapsed, the refrigerator compartment compressor. The set time is a time duration from a first time that the freezer compartment compressor is started to a second time that the freezer compartment compressor is stabilized. The set time is a time duration from a first time that a freezer compartment evaporator is started to a second time that a temperature of cooling gas generated from a freezer compartment evaporator satisfies a set temperature. Maintaining operation of the freezer compartment compressor includes: maintaining a driving frequency of the freezer compartment compressor. Maintaining operation of the freezer compartment compressor includes: driving the freezer compartment compressor with full capacity of the refrigerator compartment compressor. Restarting the refrigerator compartment compressor includes: determining a time duration from a first time that the freezer compartment compressor is started to a second time that the refrigerator compartment compressor is stopped, and determining, based on the time duration from the first time to the second time, the driving frequency of the refrigerator compartment compressor. Restarting the refrigerator compartment compressor includes: driving the refrigerator compartment compressor with partial capacity of the refrigerator compartment compressor. Stopping the refrigerator compartment compressor includes: determining whether the freezer compartment compressor is stabilized, and stopping, based on the determination that the freezer compartment compressor is stabilized, the refrigerator compartment compressor. Stopping the refrigerator compartment compressor includes: determining whether a temperature of cooling gas generated from a freezer compartment evaporator satisfies a set temperature, and stopping, based on the determination that a temperature of cooling gas generated from the freezer compartment evaporator satisfies the set temperature, the refrigerator compartment compressor. The first temperature is higher than the second temperature. Restarting the refrigerator compartment compressor includes: determining a first time duration from a first time that the freezer compartment compressor is started to a second time that the refrigerator compartment compressor is stopped, determining a second time duration that the freezer compartment is driven, determining, based on the first time duration and the second time duration, a third time duration, and driving the refrigerator compartment compressor for the third time duration. The refrigerator compartment compressor is an inverter type compressor. The freezer compartment compressor is an inverter type compressor. Determining whether a temperature in the freezer compartment satisfies a third temperature; and stopping, based on the determination that a temperature in the freezer compartment satisfies the third temperature, the freezer compartment compressor.

In general, another innovative aspect of the subject matter described in this specification can be embodied in a refrigerator comprising: a refrigerator compartment configured to maintain a first temperature; a freezer compartment configured to maintain a second temperature; a refrigerator compartment compressor configured to provide cool gas to control a temperature in the refrigerator compartment; a freezer compartment compressor configured to provide cool gas to control a temperature in the freezer compartment; and a controller configured to perform operations comprising:

driving the refrigerator compartment compressor, determining whether a temperature in the refrigerator compartment satisfies a first temperature; driving, based on the determination that a temperature in the refrigerator compartment satisfies the first temperature, the freezer compartment compressor; stopping the refrigerator compartment compressor; maintaining, after stopping the refrigerator compartment compressor, operation of the freezer compartment compressor; restarting the refrigerator compartment compressor; and varying a driving frequency of the refrigerator compartment compressor.

The foregoing and other embodiments can each optionally include one or more of the following features, alone or in combination. In particular, one embodiment includes all the following features in combination. Stopping the refrigerator compartment compressor includes: determining whether a temperature in the refrigerator compartment satisfies a second temperature; and stopping, based on the determination that a temperature in the refrigerator compartment satisfies the second temperature, the refrigerator compartment compressor. Stopping the refrigerator compartment compressor includes: determining whether a set time has elapsed since the freezer compartment compressor was started; and stopping, based on the determination that the set time has elapsed, the refrigerator compartment compressor. The operations further comprises: determining whether a temperature in the freezer compartment satisfies a third temperature; and stopping, based on the determination that a temperature in the freezer compartment satisfies the third temperature, the freezer compartment compressor.

BRIEF DESCRIPTION OF THE DRAWINGS

Like reference numbers and designations in the various drawings indicate like elements.

DETAILED DESCRIPTION

Figure 1:
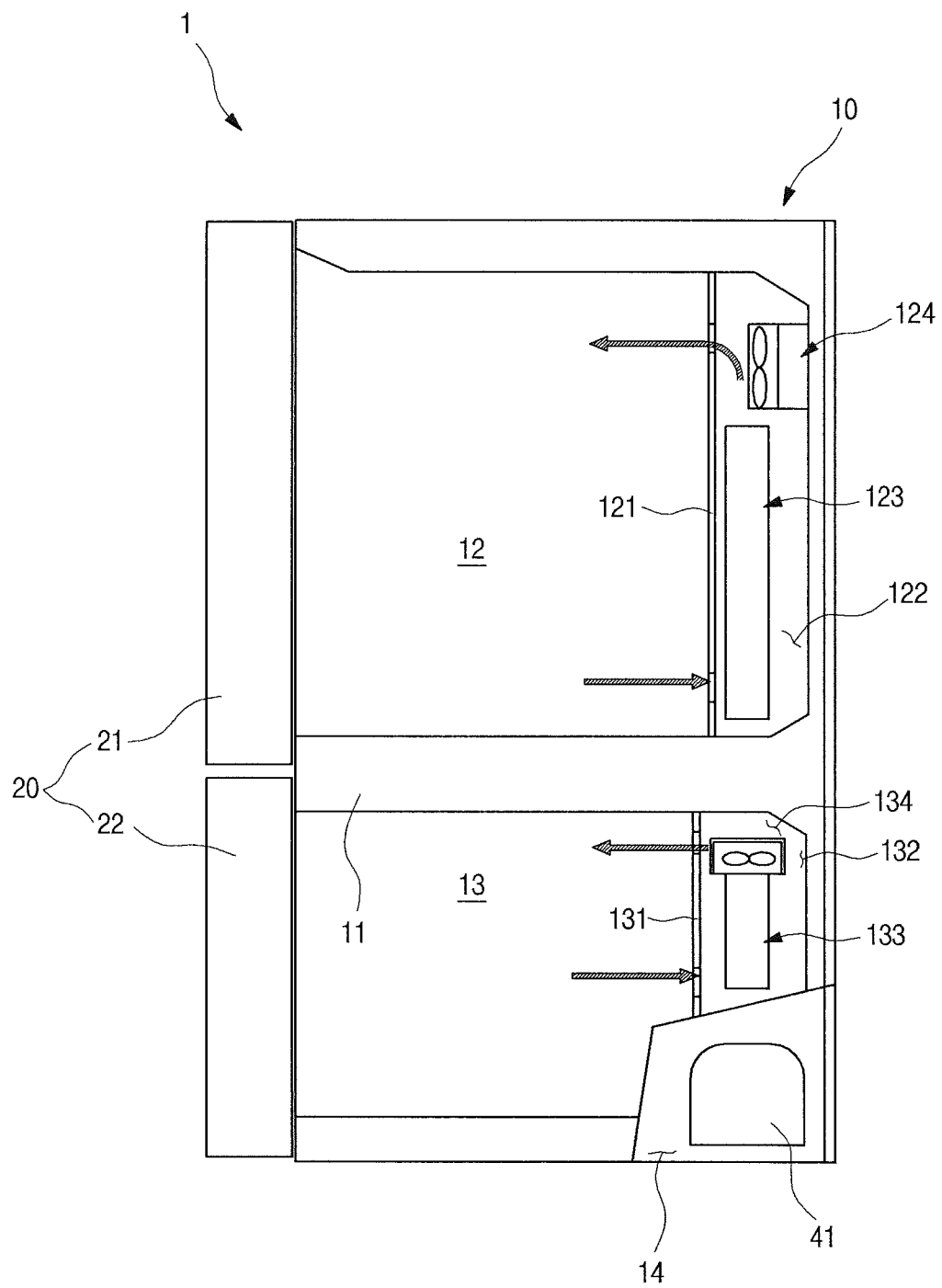
FIG. 1 is a diagram illustrating an example refrigerator.
Figure 2:
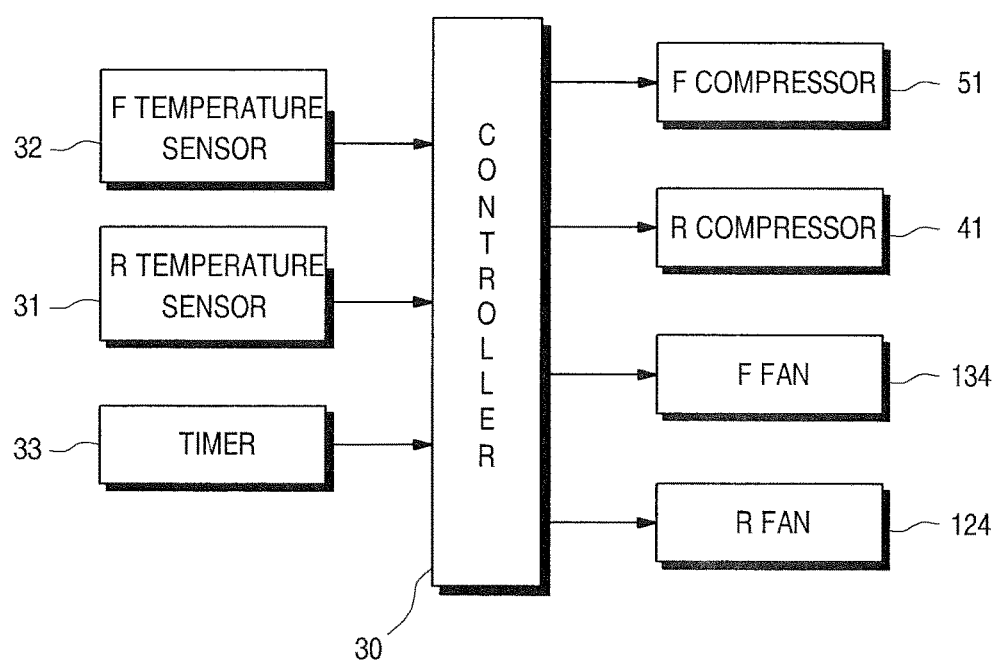
FIG. 2 is a diagram illustrating an example control signal flow for a refrigerator.
Figure 3:
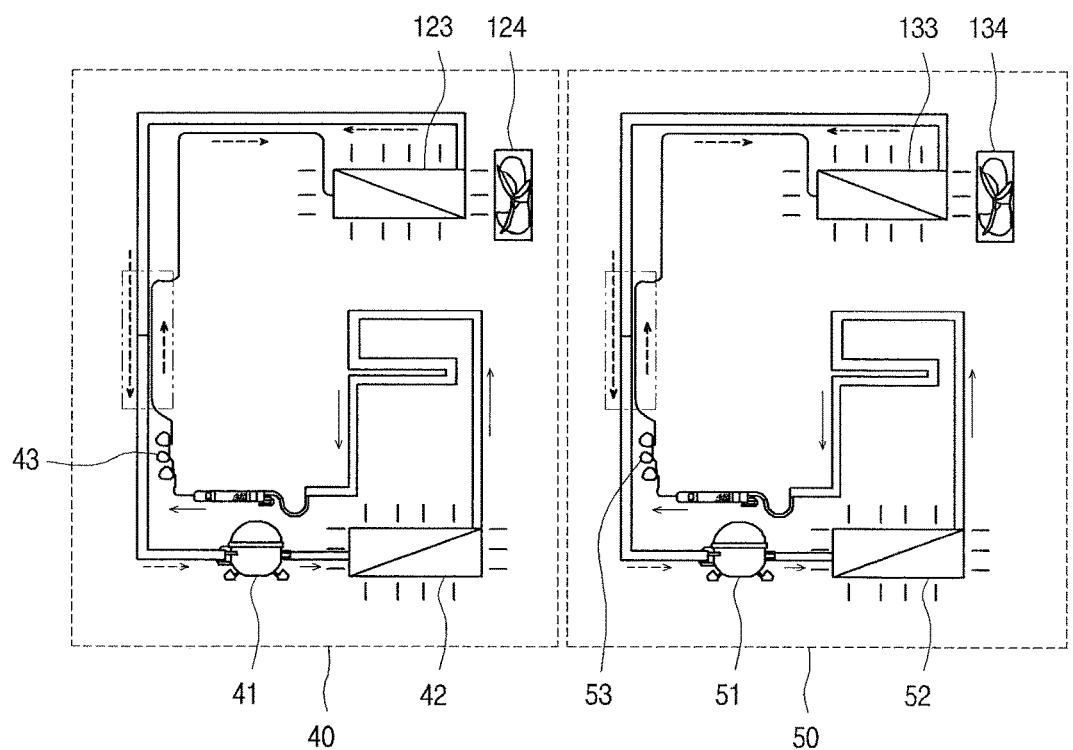
FIG. 3 is a diagram illustrating an example refrigerant flow for a refrigerator.

FIG. 1 illustrates an example refrigerator. FIG. 2 illustrates an example control signal flow for a refrigerator. FIG. 3 illustrates an example refrigerant flow for a refrigerator.

Referring to FIGS. 1-3, an entire exterior of a refrigerator 1 is formed by a refrigerator body 10 which forms a storage space and a door 20 which is installed at the refrigerator body 10 to open and close the storage space.

The storage space is partitioned into an upper portion and a lower portion by a barrier 11. In some implementations, a refrigerator compartment 12 is formed at the upper portion, and a freezer compartment 13 is formed at the lower portion. In some implementations, a refrigerator compartment 12 is formed at the lower portion, and a freezer compartment 13 is formed at the upper portion. The door 20 includes a refrigerator compartment door 21 for opening and closing the refrigerator compartment 12 and a freezer compartment door 22 for opening and closing the freezer compartment 13, and is formed to independently open and close the refrigerator compartment 12 and the freezer compartment 13. In some implementations, the refrigerator compartment door 21 and the freezer compartment door 22 may be installed at the refrigerator body 10 to be rotatable or to be slidably inserted or withdrawn and may thus open and close the refrigerator compartment 12 and the freezer compartment 13, respectively.

In some implementations, a machinery chamber 14 is formed at a lower portion of the refrigerator body 10. The machinery chamber 14 is a space partitioned from the storage space by an insulator, may be disposed on a bottom surface of the refrigerator body 10, and may be formed to be opened backward and to be shielded by a machinery chamber cover. In some implementations, a plurality of vent holes may be formed at the machinery chamber cover so that external air flows to an inside and an outside of the machinery chamber 14.

The machinery chamber 14 may include compressors 41 and 51, condensers 42 and 52, and cooling fans for promoting heat exchange of the condensers 42 and 52. The machinery chamber 14 may also include the refrigerator compartment compressor 41 and the refrigerator compartment condenser 42 forming a refrigerator compartment refrigeration cycle 40 for cooling the refrigerator compartment 12 and the freezer compartment compressor 51 and the freezer compartment condenser 52 forming a freezer compartment refrigeration cycle 50 for cooling the freezer compartment 13 may be provided in the machinery chamber 14.

A refrigerator compartment capillary tube 43 and a freezer compartment capillary tube 53 which are respectively connected to a refrigerator compartment evaporator 123 and a freezer compartment evaporator 133 may be provided at inlet sides of the refrigerator compartment evaporator 123 and the freezer compartment evaporator 133, respectively. The refrigerator compartment capillary tube 43 and the freezer compartment capillary tube 53 may be provided inside the machinery chamber 14.

In this example, the refrigerator compartment capillary tube 43 and the freezer compartment capillary tube 53 may be provided at other locations rather than the machinery chamber 14, and the locations of the parts 43, 53, 14 are not limited to the examples described above.

In some implementations, an evaporator which generates cooling gas for cooling an inside of the refrigerator 1 is provided at a rear of each of the refrigerator compartment 12 and the freezer compartment 13. The evaporator includes the refrigerator compartment evaporator 123 and the freezer compartment evaporator 133 which are provided at the rear of the refrigerator compartment 12 and the freezer compartment 13, respectively, to independently cool the refrigerator compartment 12 and the freezer compartment 13.

Specifically, a refrigerator compartment grille pan 121 is provided at a rear surface of the refrigerator compartment 12. The refrigerator compartment grille pan 121 is formed to partition a space of the refrigerator compartment 12 in which food is stored and a refrigerator compartment heat exchange chamber 122 in which the refrigerator compartment evaporator 123 for generating the cooling gas is accommodated. And an outlet port through which the cooling gas generated from the refrigerator compartment evaporator 123 is supplied to the refrigerator compartment 12 and an inlet port through which internal air of the refrigerator compartment 12 is suctioned to exchange heat with the refrigerator compartment evaporator 123 may be formed at the refrigerator compartment grille pan 121.

And the refrigerator compartment evaporator 123 is provided inside the refrigerator compartment heat exchange chamber 122, and the cooling gas for cooling an inside of the refrigerator compartment 12 is generated by the refrigerator compartment evaporator 123. And a refrigerator compartment fan 124 is provided at the refrigerator compartment heat exchange chamber 122. The refrigerator compartment fan 124 serves to forcibly blow the cooling gas generated through the refrigerator compartment evaporator 123 to the refrigerator compartment 12 to cool the refrigerator compartment 12 and also enables the air in the refrigerator compartment 12 to be suctioned to the refrigerator compartment heat exchange chamber 122 to exchange heat with the refrigerator compartment evaporator 123.

The refrigerator compartment fan 124 may use all of an axial flow fan in which the air is discharged axially and a centrifugal fan in which the air is discharged in a circumferential direction thereof according to air suctioning and discharging directions and may further include a separate air guide to smoothly supply the air to the refrigerator compartment 12. And the refrigerator compartment fan 124 may be fixed inside the refrigerator compartment heat exchange chamber 122 by a separate frame.

In some implementations, a refrigerator compartment temperature sensor 31 for measuring an internal temperature of the refrigerator compartment 12 may be provided inside the refrigerator compartment 12, and a controller 30 for controlling an operation of the refrigerator 1 may control the compressors 41 and 51, the refrigerator compartment fan 124 and a freezer compartment fan 134 according to the temperature measured by the refrigerator compartment temperature sensor 31.

And a freezer compartment grille pan 131 is provided at a rear surface of the freezer compartment 13. The freezer compartment grille pan 131 is formed to partition a space of the freezer compartment 13 in which the food is stored and a freezer compartment heat exchange chamber 132 in which the freezer compartment evaporator 133 for generating the cooling gas is accommodated. And an outlet port through which the cooling gas generated from the freezer compartment evaporator 133 is supplied to the freezer compartment 13 and an inlet port through which internal air of the freezer compartment 13 is suctioned to exchange heat with the freezer compartment evaporator 133 may be formed at the freezer compartment grille pan 131.

And the freezer compartment evaporator 133 is provided inside the freezer compartment heat exchange chamber 132, and the cooling gas for cooling an inside of the freezer compartment 13 is generated by the freezer compartment evaporator 133. And the freezer compartment fan 134 is provided at the freezer compartment heat exchange chamber 132. The freezer compartment fan 134 serves to forcibly blow the cooling gas generated through the freezer compartment evaporator 133 to the freezer compartment 13 to cool the freezer compartment 13 and also enables the air in the freezer compartment 13 to be suctioned to the freezer compartment heat exchange chamber 132 to exchange heat with the freezer compartment evaporator 133.

The freezer compartment fan 134 may also use all of the axial flow fan and the centrifugal fan, and a separate air guide or a frame for installing the freezer compartment fan 134 may be provided at the freezer compartment heat exchange chamber 132. And a freezer compartment temperature sensor 32 for measuring an internal temperature of the freezer compartment 13 may be provided inside the freezer compartment 13.

And a timer 33 for measuring a driving time of each element including the refrigerator compartment compressor 41, the freezer compartment compressor 51, the refrigerator compartment fan 124 and the freezer compartment fan 134 may be provided at the controller 30. That is, an operating time of the refrigerator compartment 12 or the freezer compartment 13 may be measured by the timer 33, and measured time information may be transmitted to the controller 30.

In some implementations, the refrigerator 1 is formed to have the refrigerator compartment refrigeration cycle 40 and the freezer compartment refrigeration cycle 50 which are separated from each other. The refrigerator compartment refrigeration cycle 40 and the freezer compartment refrigeration cycle 50 may be completely separated from each other so that operations thereof are independently controlled by the controller 30 and each of the refrigerator compartment 12 and the freezer compartment 13 may maintain a preset temperature or a preset temperature range.

Specifically, the refrigerator compartment refrigeration cycle 40 is formed so that the refrigerator compartment compressor 41, the refrigerator compartment condenser 42, the refrigerator compartment capillary tube 43 and the refrigerator compartment evaporator 123 are connected by a refrigerant pipe. And the refrigerator compartment compressor 41 is an inverter type compressor and is formed to vary a frequency according to a load in the refrigerator compartment 12 and thus to vary a compression capacity.

The cooling gas is generated from the refrigerator compartment evaporator 123 while a refrigerant is circulated by driving of the refrigerator compartment compressor 41. The cooling gas may be supplied toward the inside of the refrigerator 1 by the refrigerator compartment fan 124 and may cool the inside of the refrigerator compartment 12.

In some implementations, driving of the refrigerator compartment compressor 41 and the refrigerator compartment fan 124 may be controlled by the controller 30 according to the internal temperature of the refrigerator compartment 12 detected by the refrigerator compartment temperature sensor 31. Therefore, the refrigerator compartment 12 may be cooled to maintain the preset temperature or the preset temperature range.

And the freezer compartment refrigeration cycle 50 is formed so that the freezer compartment compressor 51, the freezer compartment condenser 52, the freezer compartment capillary tube 53 and the freezer compartment evaporator 133 are connected by the refrigerant pipe. And the freezer compartment compressor 51 is an inverter type compressor and is formed to vary a frequency according to a load in the freezer compartment 13 and thus to vary a compression capacity.

The cooling gas is generated from the freezer compartment evaporator 133 while the refrigerant is circulated by driving of the freezer compartment compressor 51. The cooling gas may be supplied toward the inside of the refrigerator 1 by the freezer compartment fan 134 and may cool the inside of the freezer compartment 13.

In some implementations, driving of the freezer compartment compressor 51 and the freezer compartment fan 134 may be controlled by the controller 30 according to the internal temperature of the freezer compartment 13 detected by the freezer compartment temperature sensor 32. Therefore, the freezer compartment 13 may be cooled to maintain the preset temperature or the preset temperature range.

As described above, the refrigerator compartment refrigeration cycle 40 and the freezer compartment refrigeration cycle 50 may be independently driven by the controller 30 and may be configured to be alternately continuously operated, thereby efficiently cooling the inside of the refrigerator 1.

That is, when the temperature of the refrigerator compartment 12 is not satisfied, cooling of the refrigerator compartment 12 is performed by driving the refrigerator compartment compressor 41. When the temperature of the refrigerator compartment 12 is satisfied, the freezer compartment 13 is cooled by driving of the freezer compartment compressor 51 until the internal temperature of the freezer compartment 13 satisfies the preset temperature or less.

Figure 4:
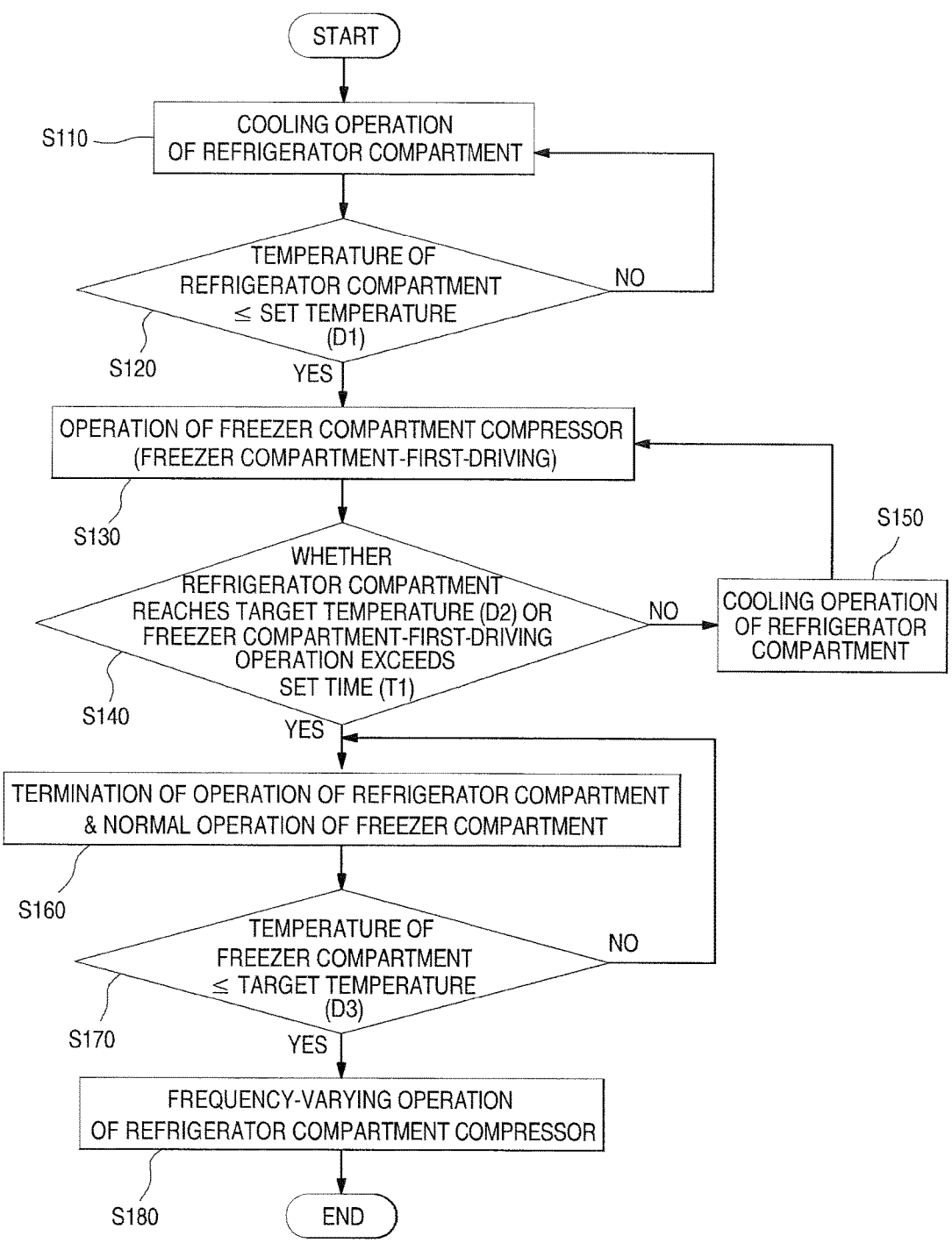
FIG. 4 is a flowchart illustrating an example control method of a refrigerator.

FIG. 4 illustrates an example control method of a refrigerator.

In this example with respect to FIG. 4, the refrigerator compartment 12 is cooled first and the freezer compartment 13 is cooled later. In some implementations, the refrigerator compartment 12 can be cooled first and the freezer compartment 13 can be cooled later.

For the cooling operation of the refrigerator compartment 12, the internal temperature of the refrigerator compartment 12 is measured by the refrigerator compartment temperature sensor 31, and the cooling operation of the refrigerator compartment 12 starts in a state in which the temperature of the refrigerator compartment 12 is unsatisfied.

The controller 30 starts and drives the refrigerator compartment compressor 41 (S110). Once the refrigerator compartment compressor 41 is driven, the refrigerator compartment fan 124 may start. The refrigerator compartment fan 124 may supply the cooling gas generated from the refrigerator compartment evaporator 123 to the refrigerator compartment 12. This period of starting and driving the refrigerator compartment compressor 41 is defined as a refrigerator compartment driving operation. During the refrigerator compartment driving operation, the freezer compartment compressor 41 is not operated.

The controller 30 determines whether the temperature of the refrigerator compartment 12 measured by the refrigerator compartment temperature sensor 31 satisfies a set temperature D1 for the operation of the freezer compartment 13 (S120). The set temperature D1 is a temperature before the cooling operation of the refrigerator compartment 12 is finished, i.e., a temperature which is higher than a target temperature D2 and at which the cooling operation of the freezer compartment 13 is performed before the cooling operation of the refrigerator compartment 12 is finished.

For example, when the target temperature D2 for cooling the refrigerator compartment 12 is 5° C., the set temperature D1 may be set to 5.5° C. which is higher than the target temperature D2. Therefore, before the refrigerator compartment 12 reaches the target temperature D2, the temperature of the refrigerator compartment 12 may reach the set temperature D1. The cooling operation of the refrigerator compartment 12 is continued until the temperature of the refrigerator compartment 12 reaches the set temperature D1. The refrigerator compartment temperature sensor 31 continuously detects and transmits the temperature to the controller 30.

The controller 30 starts and drives the freezer compartment compressor 51 based on the determination that the temperature of the refrigerator compartment 12 satisfies the set temperature D1 (S130). In particular, when the temperature of the refrigerator compartment 12 reaches at the set temperature D1, the controller 30 starts and drives the freezer compartment compressor 51. This period of starting and driving the freezer compartment compressor 51 is defined as a freezer compartment-first-driving operation. For example, the freezer compartment-first-driving operation may begin as the freezer compartment compressor 51 is started and end as the refrigerator compartment compressor 41 is stopped. During the freezer compartment-first-driving operation, the refrigerator compartment compressor 41 may be driven. Thus, the refrigerator compartment compressor 41 and the freezer compartment compressor 51 may be driven together during the freezer compartment-first-driving operation.

In some implementations, the freezer compartment compressor 51 may be an inverter type compressor. An inverter type compressor has a characteristic in which a rotating speed thereof is slowly increased until the inverter type compressor is stabilized. Thus, it takes a certain time to cool the freezer compartment 13.

During the freezer compartment-first-driving operation, the freezer compartment compressor 51 is driven. When the cooling operation of the refrigerator compartment 12 is finished, i.e., when the freezer compartment-first-driving operation ends, the freezer compartment 13 may be already cooled. Thus, even after the freezer compartment-first-driving operation, the freezer compartment 13 may be effectively cooled only by the freezer compartment compressor 51.

The controller 30 determines (i) whether the temperature of the refrigerator compartment 12 satisfies the target temperature D2 or (ii) whether the freezer compartment-first-driving operation is performed for the set time T1 (S140). Based on these determinations, the controller 30 is configured to stop the refrigerator compartment compressor 41. Thus, the freezer compartment-first-driving operation ends.

In some implementations, when the temperature of the refrigerator compartment 12 reaches at the target temperature D2, the cooling operation of the refrigerator compartment 12 may be stopped to prevent over-cooling of the refrigerator compartment 12. Thus, the controller 30 is configured to stop the refrigerator compartment compressor 41.

In some implementations, the controller 30 begins the freezer compartment-first-driving operation when the freezer compartment compressor 51 is started and driven. The timer 33 counts an elapsed time from the beginning of the freezer compartment-first-driving operation. The controller 30 records the elapsed time counted by the timer 33. Based on the elapsed time, the controller 30 can determine whether the freezer compartment-first-driving operation ends. For example, when the elapsed time exceeds the set time T1, the cooling operation of the refrigerator compartment 12 may be stopped to prevent over-cooling of the refrigerator compartment 12. Thus, the controller is configured to stop the refrigerator compartment compressor 41.

For example, when the refrigerator compartment door 21 is opened frequently, warm food is put inside the refrigerator compartment 12, or additional thermal load is generated during the freezer compartment-first-driving operation, an operation time of the refrigerator compartment 12 is increased. As the operation time for cooling the refrigerator compartment 12 is continuously increased, the operation time that the refrigerator compartment compressor 41 and the freezer compartment compressor 51 operate together is also increased. Thus, power consumption of the refrigerator increases.

In this example, even if the temperature of the refrigerator compartment 12 does not satisfy the target temperature D2, the refrigerator compartment compressor 41 is stopped when the operation time of the freezer compartment-first-driving operation exceeds a set time T1. Thus, the cooling operation of the refrigerator compartment 12 ends.

In some implementations, the set time T1 may be a time duration from a time that the freezer compartment evaporator 133 is started to a time that the cooling gas discharged from the freezer compartment evaporator 133 satisfies a certain temperature. In some implementations, the set time T1 may be a time duration from a time that the freezer compartment compressor 51 is started to a time that the freezer compartment compressor 51 is stabilized.

The controller 30 continues to drive the freezer compartment compressor 51 (i) when the temperature of the refrigerator compartment 12 does not satisfy the target temperature D2 or (ii) when the operation time of the freezer compartment-first-driving operation does not exceed the set time T1 (S150). The controller 30 is configured not to stop the refrigerator compartment compressor 41. The cooling operation of the refrigerator compartment 12 may be continuously performed.

The controller 30 maintains the operation of the freezer compartment compressor 51 (i) when the temperature of the refrigerator compartment 12 satisfies the target temperature D2 or (ii) whether the freezer compartment-first-driving operation is performed for the set time T1 (S160). The controller 30 drives the freezer compartment compressor 51 by maintaining the rotating speed of the freezer compartment compressor 51. That is, the driving frequency of the freezer compartment compressor 51 is maintained while maintaining the operation of the freezer compartment compressor 51. Thus, the freezer compartment evaporator 133 may supply cooling gas for cooling the freezer compartment 13 to the freezer compartment 13 so that the freezer compartment 13 may be continuously cooled.

The controller 30 determines whether the temperature in the freezer compartment 13 satisfies a target temperature D3 using the freezer compartment temperature sensor 32 (S170). When the temperature in the freezer compartment 13 satisfies the target temperature D3, the freezer compartment compressor 51 is stopped.

As the freezer compartment compressor 51 is stopped, the controller 30 restarts and drives the refrigerator compartment compressor 41 (S180). In some implementations, the refrigerator compartment compressor 41 is not operated with substantially full capacity. For example, the refrigerator compartment compressor 41 may be operated with 80-90% of the capacity. In this example, a driving frequency of the refrigerator compartment compressor 41 can be variable. The period of restarting and driving the refrigerator compressor 41 at the variable driving frequency can be defined as a frequency-varying operation. During the frequency-varying operation, the rotating speed of the refrigerator compartment compressor 41 may be reduced.

During the frequency variable operation, the cooling operation of the refrigerator compartment 12 may be performed for a time duration of the cooling operation of the freezer compartment 13 shortened by the time duration of the freezer compartment-first-driving operation. The driving frequency of the refrigerator compartment compressor 41 may be determined based on the time duration of the freezer compartment-first-driving operation.

Figure 5:
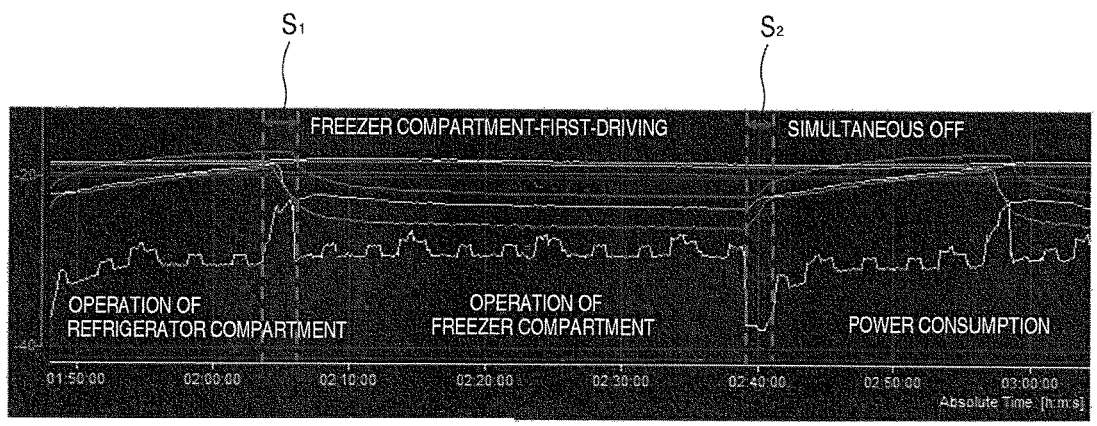
FIG. 5 is a chart illustrating an example power consumption of a refrigerator.
Figure 6:
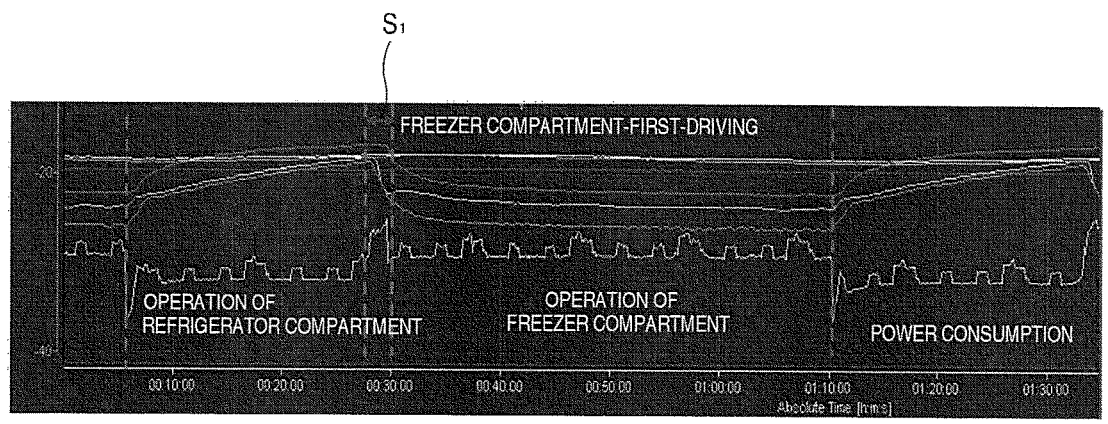
FIG. 6 is a chart illustrating an example power consumption of a refrigerator.

FIGS. 5-6 illustrating an example power consumption of a refrigerator. In particular, the example power consumption chart in FIG. 5 illustrates a change of the power consumption during the freezer compartment-first-driving operation. The example power consumption chart in FIG. 6 illustrates a change of the power consumption during the frequency-varying operation after the freezer compartment-first-driving operation of the refrigerator.

As illustrated in the drawings, when the temperature of the refrigerator compartment 12 satisfies the set temperature D1 in a state in which the cooling operation of the refrigerator compartment 12 is performed by the driving of the refrigerator compartment compressor 41, the freezer compartment-first-driving operation in which the driving of the freezer compartment compressor 51 starts is performed.

During a freezer compartment-first-driving operation section S1, the refrigerator compartment compressor 41 is driven together, and when the temperature of the refrigerator compartment 12 satisfies the target temperature D2 or the freezer compartment-first-driving operation is continued for the set time, the cooling operation of the refrigerator compartment 12 is stopped, and the cooling operation of the freezer compartment 13 is performed.

As illustrated in FIG. 5, an entire operation time of the cooling operation of the freezer compartment 13 may be shortened by the time of the freezer compartment-first-driving operation due to the freezer compartment-first-driving operation which is previously performed, and thus a simultaneous-off section S2 may be ensured before performing of the cooling operation of the refrigerator compartment 12 after a termination of the cooling operation of the freezer compartment 13. The simultaneous-off section S2 is a section in which both of the refrigerator compartment compressor 41 and the freezer compartment compressor 51 are stopped, and may have the same time as the time of the freezer compartment-first-driving operation.

Therefore, as illustrated in FIG. 6, the cooling operation of the refrigerator compartment 12 which is performed after the cooling operation of the freezer compartment 13 may be further operated by a time of the simultaneous-off section S2, that is, a time of the freezer compartment-first-driving operation section S1. By securing the additional operation time, the controller 30 may vary a RPM of the refrigerator compartment compressor 41. That is, by controlling the frequency of the refrigerator compartment compressor 41 to enhance power consumption efficiency, the operation may be further performed for a longer time.

According to the control method for a refrigerator, the following effects can be expected.

In a state in which the freezer compartment compressor is driven at a back end of the cooling operation of the refrigerator compartment and the driving of the freezer compartment compressor is stabilized, the cooling operation of the freezer compartment is performed, and thus a time when the freezer compartment satisfies a target temperature can be shortened.

When the cooling operation of the refrigerator compartment is performed after that, a time of the cooling operation of the refrigerator compartment can be increased by shortening the time when the freezer compartment satisfies the target temperature. Accordingly, the frequency-varying operation in which the refrigerator compartment compressor is operated in a state in which a capacity thereof is reduced to correspond to the increased operation time can be performed. Therefore, the refrigerator compartment compressor can be efficiently operated, and the power consumption can be reduced.

Particularly, due to the characteristic of the inverter type compressor, the freezer compartment-first-driving operation is performed for a time before the driving thereof is stabilized. Thus, the power consumption of the refrigerator can be minimized even when the refrigerator compartment compressor and the freezer compartment compressor are simultaneously operates.

What is claimed is:
1. A control method for a refrigerator, comprising:
driving a refrigerator compartment compressor that is configured to cool a refrigerator compartment;

determining whether a temperature in the refrigerator compartment is less than or equal to a first temperature;

driving, in response to the temperature in the refrigerator compartment being less than or equal to the first temperature, a freezer compartment compressor that is configured to cool a freezer compartment when the refrigerator compressor is driven;

stopping the refrigerator compartment compressor when the freezer compartment compressor is driven;

maintaining, after stopping the refrigerator compartment compressor, operation of the freezer compartment compressor;

in response to completion of operation of the freezer compartment compressor, restarting the refrigerator compartment compressor at a driving frequency to cool the refrigerator compartment to a second temperature; and in response to restarting the refrigerator compartment compressor, varying the driving frequency of the refrigerator compartment compressor to correspond to a reduced capacity that is less than a full capacity of the refrigerator compartment compressor.

2. The control method of claim 1, further comprising:
determining whether the temperature in the refrigerator compartment is less than or equal to the second temperature when the refrigerator compartment compressor and freezer compartment compressor are driven, wherein stopping the refrigerator compartment compressor Is in response to the determination that the temperature in the refrigerator compartment is less than or equal to the second temperature.

3. The control method of claim 1, further comprising:
determining whether a set time has elapsed since the freezer compartment compressor was started, wherein stopping the refrigerator compartment compressor is in response to the determination that the set time has elapsed.

4. The control method of claim 3, wherein determining whether the set time has elapsed comprises:
determining the time duration from a first time at which the freezer compartment compressor is started to a second time at which a rotation speed of the freezer compartment compressor has reached a target speed; and determining whether the time duration is greater than or equal to the set time.

5. The control method of claim 3, wherein determining whether the set time has elapsed comprises:
determining the time duration between a first time at which a freezer compartment evaporator is started and a second time at which a temperature of a cooling gas generated from the freezer compartment evaporator is less than or equal to a set temperature; and determining whether the time duration is greater than or equal to the set time.

6. The control method of claim 3, wherein maintaining operation of the freezer compartment compressor includes:
maintaining a driving frequency of the freezer compartment compressor.

7. The control method of claim 3, wherein maintaining operation of the freezer compartment compressor includes:

driving the freezer compartment compressor with a freezer driving frequency of the freezer compartment compressor to correspond to a full capacity of the freezer compartment compressor.

8. The control method of claim 1, wherein restarting the refrigerator compartment compressor includes:
determining the time duration from a first time that the freezer compartment compressor is started to a second time that the refrigerator compartment compressor is stopped, and determining, in response to the time duration from the first time to the second time, the driving frequency of the refrigerator compartment compressor.

9. The control method of claim 1, wherein restarting the refrigerator compartment compressor includes:
driving the refrigerator compartment compressor at a driving frequency corresponding to 80 to 90% of the full capacity of the refrigerator compartment compressor.

10. The control method of claim 1, further comprising:
determining whether a rotation speed of the freezer compartment compressor has reached a target speed, wherein stopping the refrigerator compartment compressor is in response to the determination that the rotation speed of the freezer compartment compressor has reached the target speed.

11. The control method of claim 1, further comprising:
determining whether a temperature of a cooling gas generated from a freezer compartment evaporator is less than or equal to a set temperature, wherein stopping the refrigerator compartment compressor is in response to the determination that the temperature of cooling gas is less than or equal to the set temperature, the refrigerator compartment compressor.

12. The control method of claim 2, wherein the first temperature is higher than the second temperature.

13. The control method of claim 1, wherein restarting the refrigerator compartment compressor includes:
determining a first time duration from a first time that the freezer compartment compressor is started to a second time that the refrigerator compartment compressor is stopped, determining a second time duration during which the freezer compartment compressor has been driven, determining, in response to the first time duration and the second time duration, a third time duration, and driving the refrigerator compartment compressor for the third time duration.

14. The control method of claim 1, wherein the refrigerator compartment compressor is an inverter type compressor.

15. The control method of claim 1, wherein the freezer compartment compressor is an inverter type compressor.

16. The control method of claim 1, further comprising:
determining whether a temperature in the freezer compartment is less than or equal to a third temperature; and in response to the determination that the temperature in the freezer compartment is less than or equal to the third temperature, stopping the freezer compartment compressor.

* * * * *